United States Patent [19]

McHugh

[11] 4,339,160

[45] Jul. 13, 1982

[54] SEALING ARRANGEMENT FOR HOT BEARING HOUSINGS

[76] Inventor: James D. McHugh, 1152 Rosehill Blvd., Schenectady, N.Y. 12309

[21] Appl. No.: 224,323

[22] Filed: Jan. 12, 1981

[51] Int. Cl.³ .................................. F16C 33/74
[52] U.S. Cl. ........................... 308/36.3; 308/76
[58] Field of Search ............. 308/36.3, 76, 77, 36.1, 308/122, 187, 126, 123

[56] References Cited

U.S. PATENT DOCUMENTS

| | | | |
|---|---|---|---|
| 2,749,087 | 6/1956 | Blackman et al. | 60/39.08 |
| 2,791,090 | 5/1957 | Hooker | 60/39.08 |
| 3,417,562 | 12/1968 | Morris | 60/307 |
| 3,722,624 | 3/1973 | Buckland | 184/6.11 |
| 3,734,580 | 5/1973 | Piscitelli | 308/36.3 |
| 3,740,170 | 6/1973 | Miller | 417/407 |
| 3,779,345 | 12/1973 | Barnes | 184/6.4 |
| 4,009,972 | 3/1977 | Sarle | 417/407 |
| 4,046,223 | 9/1977 | McHugh | 308/76 |
| 4,111,500 | 9/1978 | Ando | 308/36.3 |
| 4,156,342 | 5/1979 | Korta et al. | 308/76 |

*Primary Examiner*—Lenard A. Footland

[57] ABSTRACT

An arrangement for minimizing blockage of drain back holes from bearing housings seal cavity areas is provided. Leakage drain tubes, made of high thermal conductivity material, are positioned in the path of lube oil drain flow and serve to carry leakage oil from seal air cavities back to the lube oil drain flow path. The leakage drain tubes are cooled by the lubricating oil in the drain flow path, extending from the sump to the oil drain pipe and include flow restrictor portions at their ends to minimize hot gas leakage around the labyrinth seal.

13 Claims, 2 Drawing Figures

SEALING ARRANGEMENT FOR HOT BEARING HOUSINGS

BACKGROUND OF THE INVENTION

1. Field of the Invention

The present invention relates to engine bearings. More particularly the present invention relates to an improved sealing arrangement for an oil lubricated bearing used with a turbine.

2. Description of the Prior Art

The use of oil lubricated bearings in turbines is well known. For example, U.S. Pat. Nos. 3,722,624, issued to Buckland on Mar. 27, 1973, 3,779,345, issued to Barnes et al on Dec. 18, 1973, and 4,046,223, issued to McHugh on Sept. 6, 1977, all of which are assigned to the assignee of the present invention, show such lubricated bearing systems. The subject matter of U.S. Pat. No. 4,046,223 is hereby incorporated by reference.

A typical known form of prior art structure is shown in FIG. 1, wherein an oil lubricated bearing 10 (shown in cross section) rotatably supports shaft 12 of a turbine. The bearing 10, which includes a bearing housing 14 and bearing liner 16, is fed oil or similar lubricating fluid by way of sump 22. The forward end 24A, as viewed in the drawing, of bearing 10 includes a seal having an air seal portion 26A and an oil seal portion 28A which serve to minimize leakage of oil from the bearing. A similar seal having an air seal portion 26B and an oil seal portion 28B minimizes leakage on the rear side 24B of bearing 10. As is well known in the art, compressor discharge air cooperates with the seals to minimize oil leakage from the bearing 10. Air which has leaked past the air seal portion of one of the seals may proceed out of vent 30 by way of a leakage path such as 32A or 32B. Oil which has leaked past one of the oil seal portions may proceed through one of the leakage paths such as 32C or 32D. Such leakage oil will then accumulate in the lower portion of the seal air cavities, 34A and 34B. The oil in cavities 34A and 34B will flow through drain-back holes 36A and 36B back to oil drain flow path in sump 22 and drain pipe 20.

One problem with the simple drain-back holes is that they eventually become blocked due to varnish build-up from the leaking lube oil. Varnish build-up is caused by the high service temperature of the metal in which the drain-back holes are drilled. The high metal temperature in turn is brought about by the fact that some bearing housings operate in hot ambient environments. The bearing housing of a gas turbine, for example, is surrounded by compressor discharge air which may exceed 550° F.

When the drain-back holes are blocked and the turbine is operated with a momentary loss of seal air, leakage oil can accumulate in the seal cavity between the oil and air seals (FIG. 1). Continued leakage may cause the leakage lube oil to spill past the air seals and outside the bearing housing. An accumulation of oil outside the bearing housing poses a serious fire hazard.

It should also be noted that turbines usually rely on their own high speed rotation to generate seal air, therefore, are frequently placed in a situation in which seal air is absent, the lube oil pumps are on, and the bearing housings are hot from prior turbine operation. Turning gear operation is the most prominent example of this situation. Thus the conditions favoring a blockage of the drain-back holes are not unusual.

Three choices suggest themselves for resolving the drain-clogging problem, each having certain disadvantages.

1. Stop the lube oil pumps when seal air is absent. This approach suffers from the disadvantage that the lube oil flow at shutdown is essential to keep heat soak-back from damaging the low melting point bearing liner babbitt.
2. Provide an auxiliary source of seal air not dependent upon high speed rotation of the turbine itself. This approach requires additional equipment with the consequent disadvantages of high cost, lower reliability and high power consumption.
3. Enlarge the drain-back hole size. This has been the standard response to resolve the problem. The objective of this approach is to lengthen the time it takes for varnish or sludge to plug up the hole; however, increased hot gas leakage occurs during normal operation, because the drain-back hole provides a direct by-pass around the labyrinth seal. Increased seal air leakage is of course undesirable from a power loss standpoint.

It is therefore an object of the present invention to provide an improved sealing arrangement to minimize leakage of oil, or similar lubricating fluids, from a bearing.

A further and more specific object of the present invention is to provide an arrangement which avoids clogging of the leakage oil drain holes in a turbine journal bearing.

SUMMARY OF THE INVENTION

The above and other objects of the present invention are accomplished by the use of heat conducting leakage drain tubes which extend into the drain flow path, thereby maintaining a cooler temperature than would otherwise be possible and inhibiting the formation of varnish or sludge. Each leakage drain tube may include a flow restrictor at its drain end. Thermal contact between the leakage and drain tube and the oil drain flow is maximized, whereas thermal contact between each of the leakage drain tubes and the bearing housing is minimized.

BRIEF DESCRIPTION OF DRAWINGS

These and other features of the present invention and the attendant advantages will be readily apparent to those having ordinary skill in the art and the invention will be more easily understood from the following detailed description of the preferred embodiment of the present invention taken in conjunction with the accompanying drawings wherein.

DESCRIPTION OF THE PREFERRED EMBODIMENT

Figure 1:
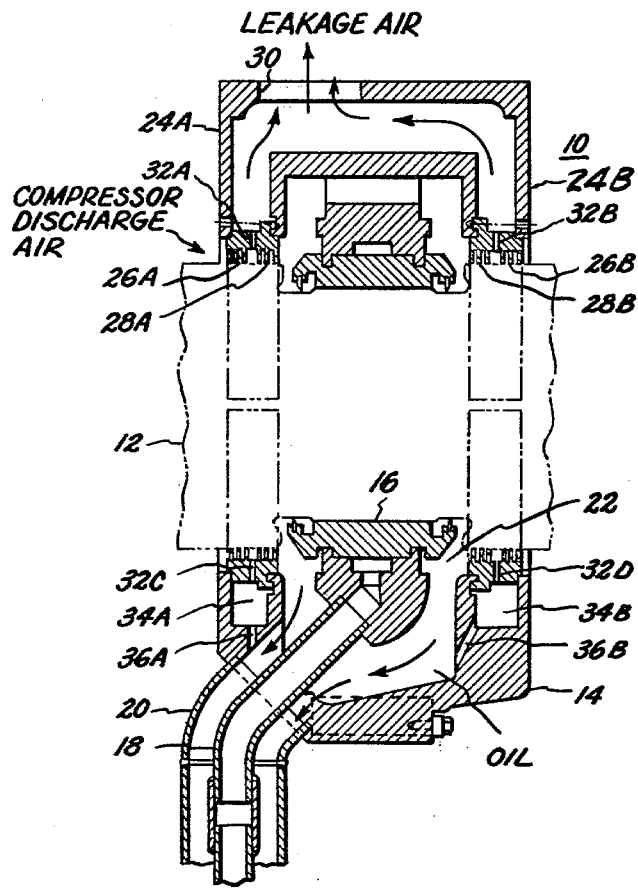
FIG. 1 is a cross section view of a journal bearing according to the prior art.
Figure 2:
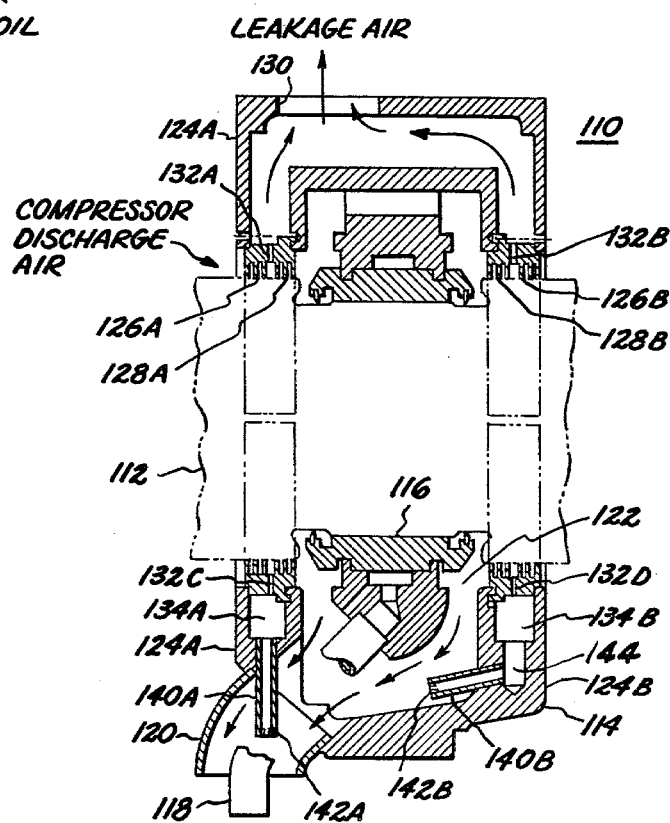
FIG. 2 is a partial cross section view of a bearing arrangement according to the present invention.

Referring to FIG. 2 there is shown a cross-section of a bearing housing of the type shown in FIG. 1, but constructed according to the present invention. To aid in comparison, like parts in FIG. 2 are identified in the 100 series with the two lower order digits corresponding to the reference character designation used in FIG. 1. Thus, oil feed tube 118, oil drain pipe 120, bearing housing 114 with forward end 124A and rear side 124B and sump 122 correspond generally to the similar parts shown in FIG. 1.

In accordance with the present invention, blockage prone drain-back holes, such as 36A and 36B of FIG. 1, are avoided through the use of leakage drain tubes 140A and 140B. Leakage drain tubes 140A and 140B extend into the drain flow path of sump 122 and drain pipe 120, and consequently will be cooled by lubricating oil which flows from the liner to sump 122 around the outer surface of leakage drain tubes 140A and 140B before exiting through drain pipe 120. Flow restricting portions 142A and 142B are positioned at the lower or drain ends of the respective leakage drain tubes 140A and 140B.

In accordance with the present invention, blockage of the lubricating oil due to varnish build-up is minimized by keeping the oil cool. Each 10° C. increase of oil temperature doubles its oxidation rate. Therefore, if the oil temperature can be lowered by 100° C. (180° F.,) the oxidation rate will be decreased by a factor over 1000. It should thus be appreciated that even modest decreases in the leakage lubricating oil temperature are effective in avoiding the varnish and sludge build-up which typically forms in the drain back holes of known bearing housing structures.

The operation of the present invention will be presently discussed with respect to leakage drain tube 140B. Lubricating oil, which has partially leaked past the seal (not shown in FIG. 2), will pass through a leakage path in the seal (such as 32D of FIG. 1) and collect at the lower end of air seal cavity 134B in the same manner as described with respect to the prior art. The oil will then flow down air seal cavity extension 144 where it enters leakage drain tube 140B. Unlike the situation with respect to the drainback holes of the prior art, the enlargement of the diameter of air seal cavity extension 144 will not cause an increase in the seal air leakage because of flow restrictor portion 142B. Accordingly, air seal cavity extension 144 may be provided with a large enough diameter to minimize any chances of clogging. Likewise, leakage drain tube 140B may be provided with a relatively large inner diameter. As with the air seal cavity extension 144, the inner diameter of drain leakage tube 140B may be made larger than a conventional drain back hole because the flow restricting portion 142B has a smaller diameter or opening and, therefore, will minimize seal air leakage. It will thus be appreciated that the size of air seal cavity extention 144 and drain leakage 140B makes clogging highly unlikely at all places except the flow restrictor end 142B of leakage drain tube 140B. However, flow restrictor portion 142B will be cool enough to prevent the formation of clogging varnish of sludge because it is positioned directly in the oil drain flow path and because it is thermally removed from bearing housing 114 by a substantial portion of the length of drain leakage tube 140B.

Operation of leakage drain tube 140A is similarly straight forward, the only difference being the absence of a seal air cavity extension because of the location of the drain tube 120 with respect to housing 114. Alternately, if the drain pipe 120 is placed in the middle of the sump 122, as shown for example in the above-mentioned McHugh U.S. Pat. No. 4,046,223, an air seal cavity extension could be used for both the forward side 124A and rear side 124B leakage oil.

It will thus be appreciated that the present invention essentially realizes the advantages of the enlarged drain back hole without suffering the disadvantage of increased seal air leakage. Because this is accomplished by keeping the flow restrictor portions 142A and 142B as cool as possible, it is desirable to minimize heat conduction from the bearing housing 114 to the leakage drain tube 140A and 140B. At the same time, heat transfer from the leakage drain tubes to the main stream of lubricating oil in the drain flow path should be maximized. To this end, contact between the leakage drain tubes and the relatively high temperature bearing housing 114 should be minimized, which makes it advantageous to include air seal cavity 144 instead of a curved, longer drain leakage tube 140B extending to the air seal cavity 134B. Furthermore, the leakage drain tubes 140A and 140B may be made of a high thermal conductivity material so that the lubricating oil in sump 122 and drain pipe 120 may more efficiently cool the relatively hotter oil passing through the leakage drain tubes. Copper, copper alloys, and aluminum are suitable high thermal conductivity materials which may be used for the leakage drain tubes. The bearing housing is usually made of cast steel.

The present arrangement of cooled leakage drain tubes allows the flow restrictor portions to be maintained at a temperature close to that of the main lubricating oil drain temperature, i.e. 140° F.–160° F. In contrast, the temperature in the walls of the drain back holes in 36A and 36B of FIG. 1 will usually be approximately of 350° F.–400° F. Accordingly, by keeping the temperature, and thus the oxidation rate, at a low value at the flow restrictor portions 142A and 142B of the leakage drain tubes 140A and 140B, respectively, build-up of varnish and sludge is minimized.

Although the invention has been described in terms of a preferred embodiment, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A machine having a shaft, a journal bearing rotatably supporting said shaft, said bearing having a bearing housing and a lubricating fluid sump within the housing, a feed tube supported to the housing for feeding lubricating fluid to said bearing, a drain pipe in communication with the lubricating fluid sump for draining lubricating fluid from said bearing, said drain pipe and lubricating fluid sump together defining a lubricating fluid drain flow path, first seal means about the shaft for minimizing lubricating fluid leakage from said bearing to outside of said bearing housing, and a first leakage drain tube for receiving lubricating fluid which has leaked at least partially past said first seal and for carrying said leaked lubricating fluid to said drain flow path, said first leakage drain tube having a first end supported to said bearing housing and a second end extending into said drain flow path, said first leakage drain tube adapted to be cooled by lubricating fluid in said drain flow path.

2. The machine of claim 1 wherein the second end of said first leakage drain tube includes a flow-restricting portion in the drain flow path.

3. The machine of claim 1 wherein said bearing further includes a bearing liner, and said feed tube serves to feed lubricating fluid to said bearing liner, said first seal having an air seal portion and a lubricating fluid seal portion, and said first leakage drain tube being connected to receive lubricating fluid which has leaked past the lubricating fluid seal portion of the first seal means.

4. The machine of claim 3 wherein the machine is a turbo-engine.

5. The machine of claim 1 further including a second seal means for minimizing lubricating fluid leakage from said bearing to outside of said bearing housing, said second seal means having an air seal portion and a lubricating fluid seal portion, a second leakage drain tube for receiving lubricating fluid which has leaked past said lubricating fluid seal portion of said second seal and for carrying said leaked lubricating fluid to said drain flow path, said second leakage drain tube having a first end supported to said bearing housing and a second end extending into said drain flow path, second leakage drain tube to be cooled by lubricating fluid in said drain flow path.

6. The machine of claim 5 wherein the second end of each leakage drain tube includes a flow-restricting portion in the drain flow path.

7. The machine of claim 5 wherein said bearing further includes a bearing liner, and said feed tube serves to feed lubricating fluid to said bearing liner, said first seal means having an air seal portion and a lubricating fluid seal portion, and said first leakage drain tube being connected to receive lubricating fluid which has leaked past the lubricating fluid seal portion of the first seal means.

8. The machine of claim 5 wherein the machine is a turbe-engine.

9. The machine of claim 5 further including first and second seal air cavities disposed in said bearing housing and respectively associated with said first and second seal means including a leakage path communicating with the associated seal air cavity, and wherein the first and second leakage drain tubes receive lubricating fluid respectively from said first and second seal air cavities.

10. The machine of claim 9 wherein said leakage drain tubes are made of a relatively high thermal conductivity material.

11. The machine of claim 10 wherein said leakage drain tubes are made of material selected from the group of:
copper,
copper alloy,
and aluminum.

12. The machine of claim 10 wherein each of said leakage drain tubes includes a flow restricting portion in the drain flow path.

13. The machine of claim 10 wherein a seal air cavity extension connect at least one of said first and second seal air cavities to an associated one of said first and second leakage drainage tubes.

* * * * *